Sept. 11, 1928.
F. S. MIOTON ET AL
1,684,357
PLASTERING MACHINE
Filed May 19, 1927     9 Sheets-Sheet 6
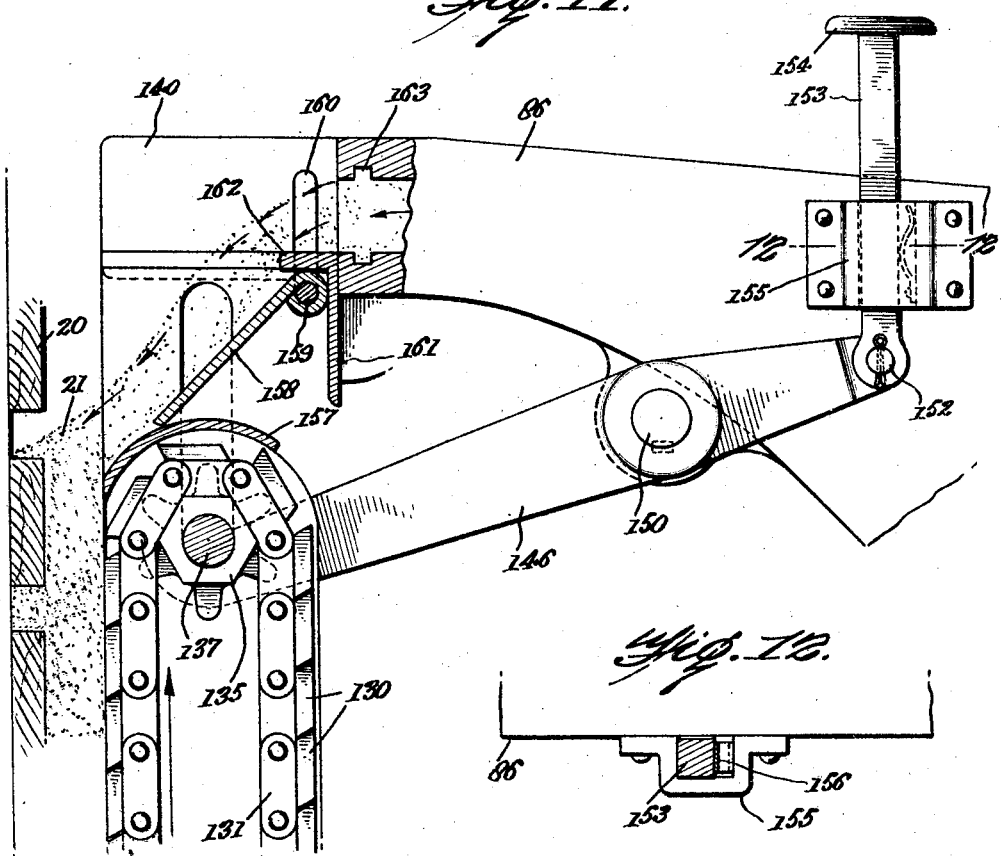
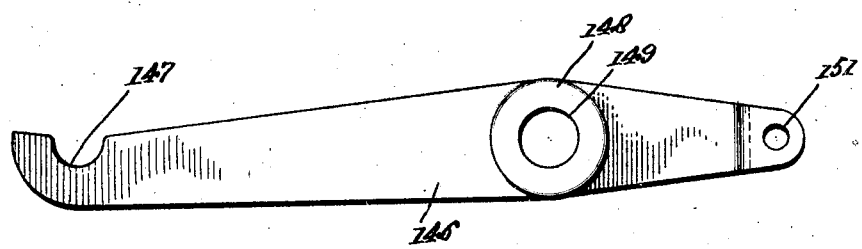
INVENTORS.
F. S. Mioton
and Louis H. Guerin
by Wilkinson & Giusta
ATTORNEYS.

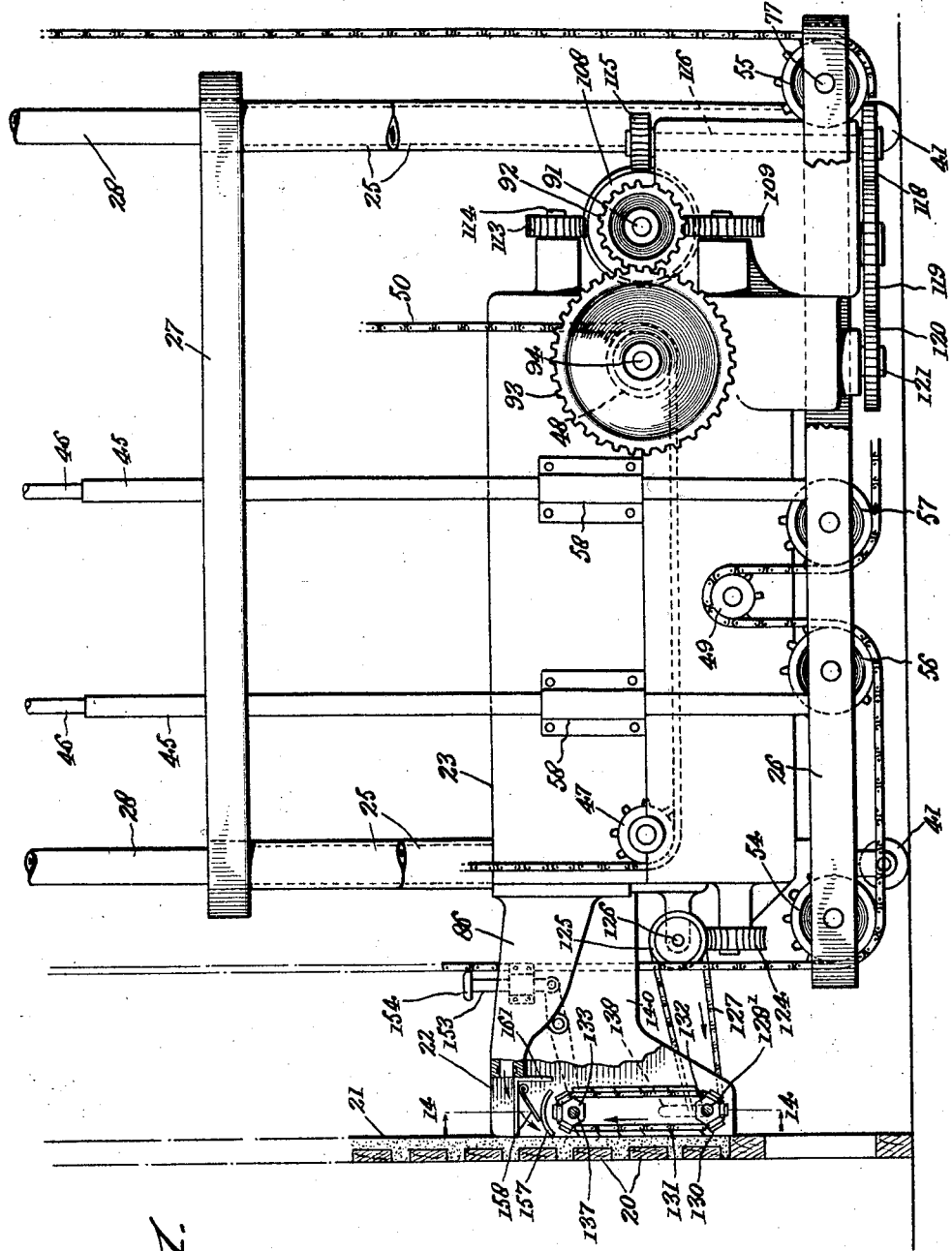
Sept. 11, 1928.
F. S. MIOTON ET AL
PLASTERING MACHINE
Filed May 19, 1927
1,684,357
9 Sheets-Sheet 1
INVENTORS
F. S. Mioton
and Louis H. Guerin
by Wilkinson & Giusta
ATTORNEYS.

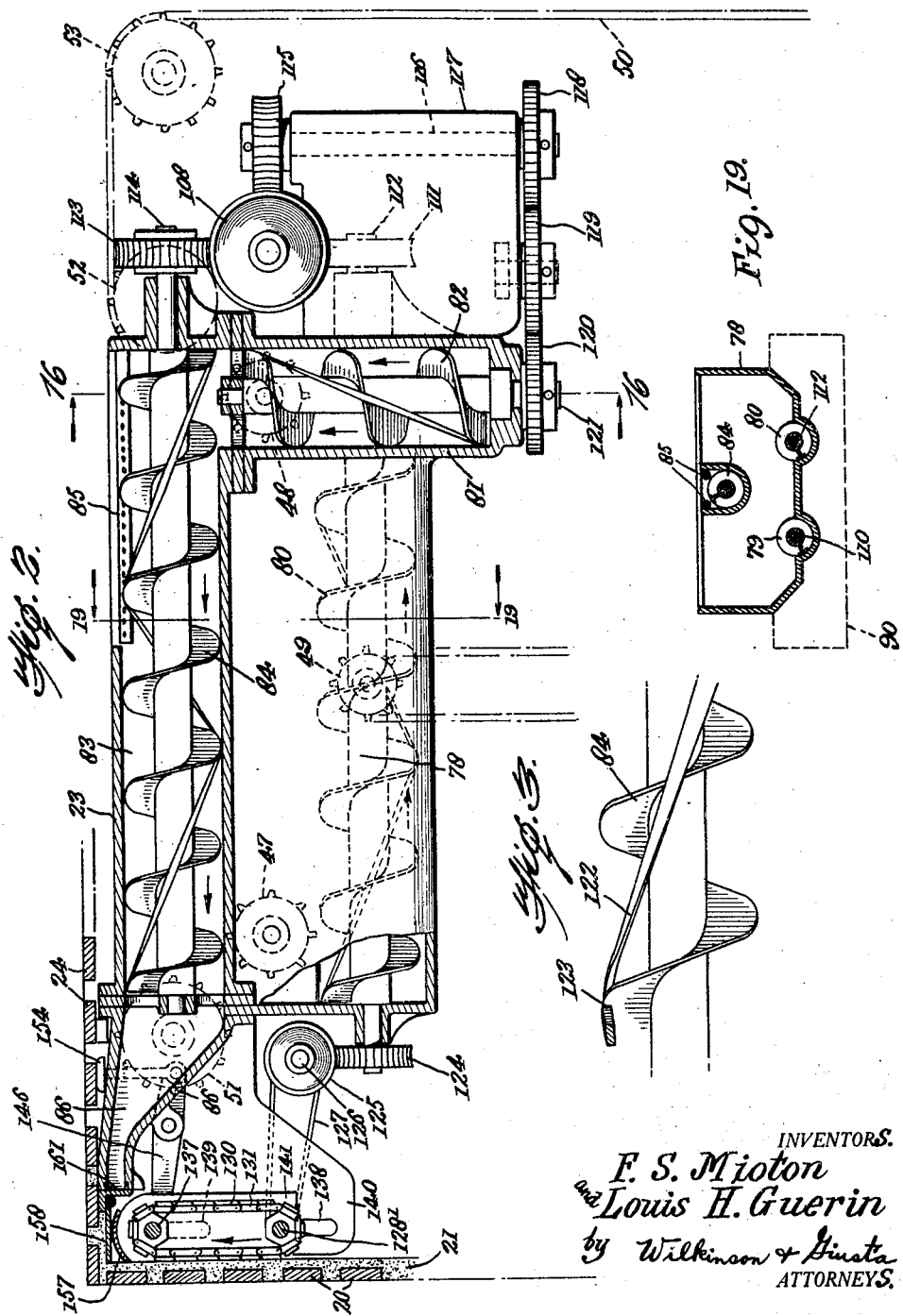

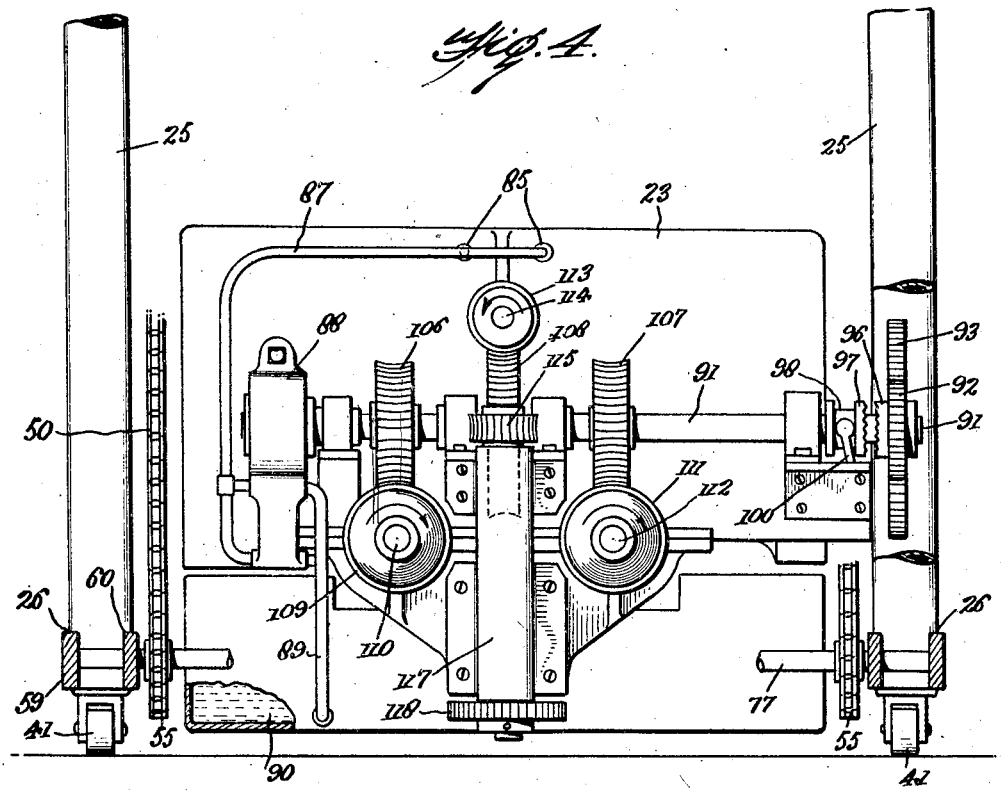
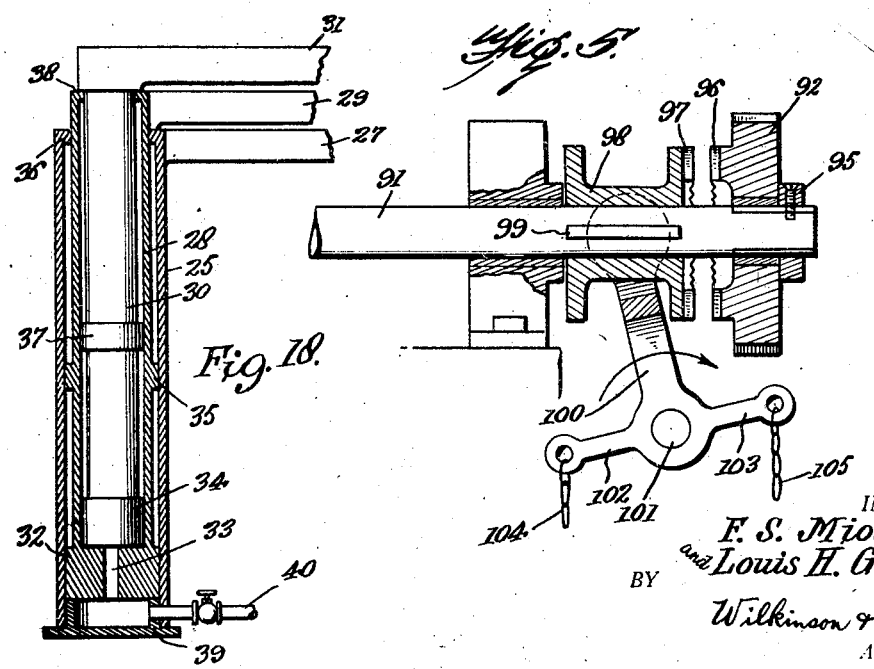

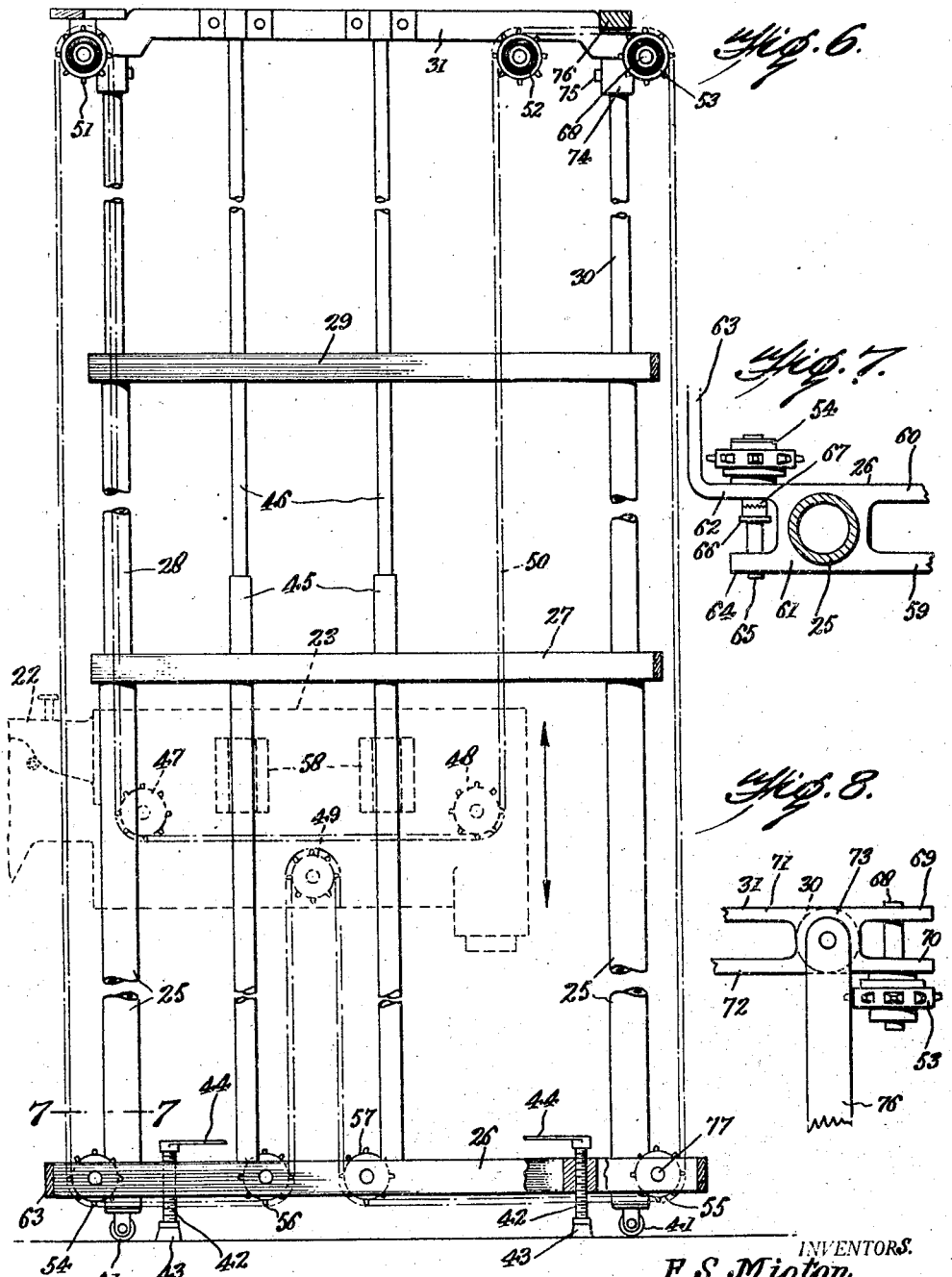

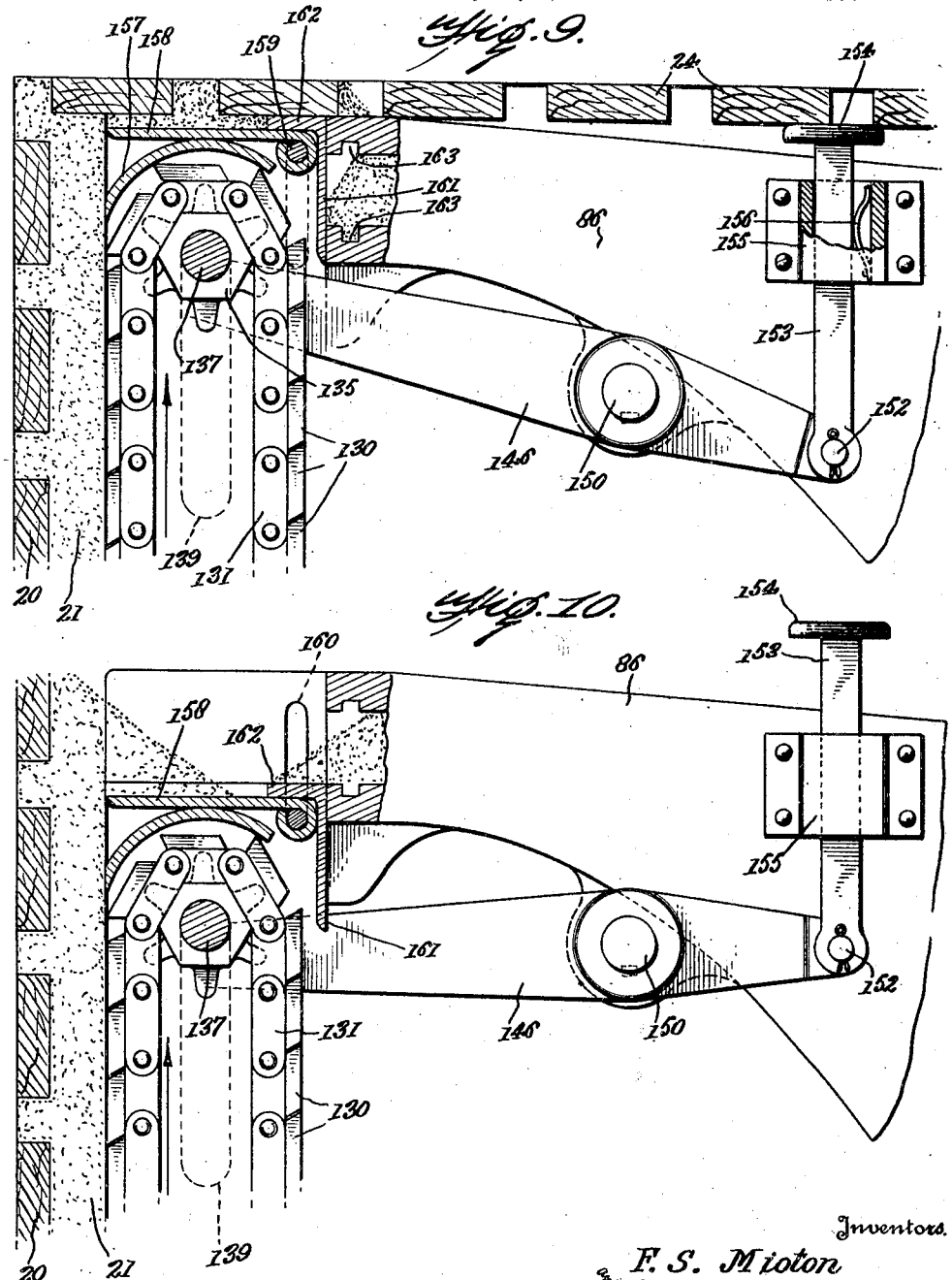

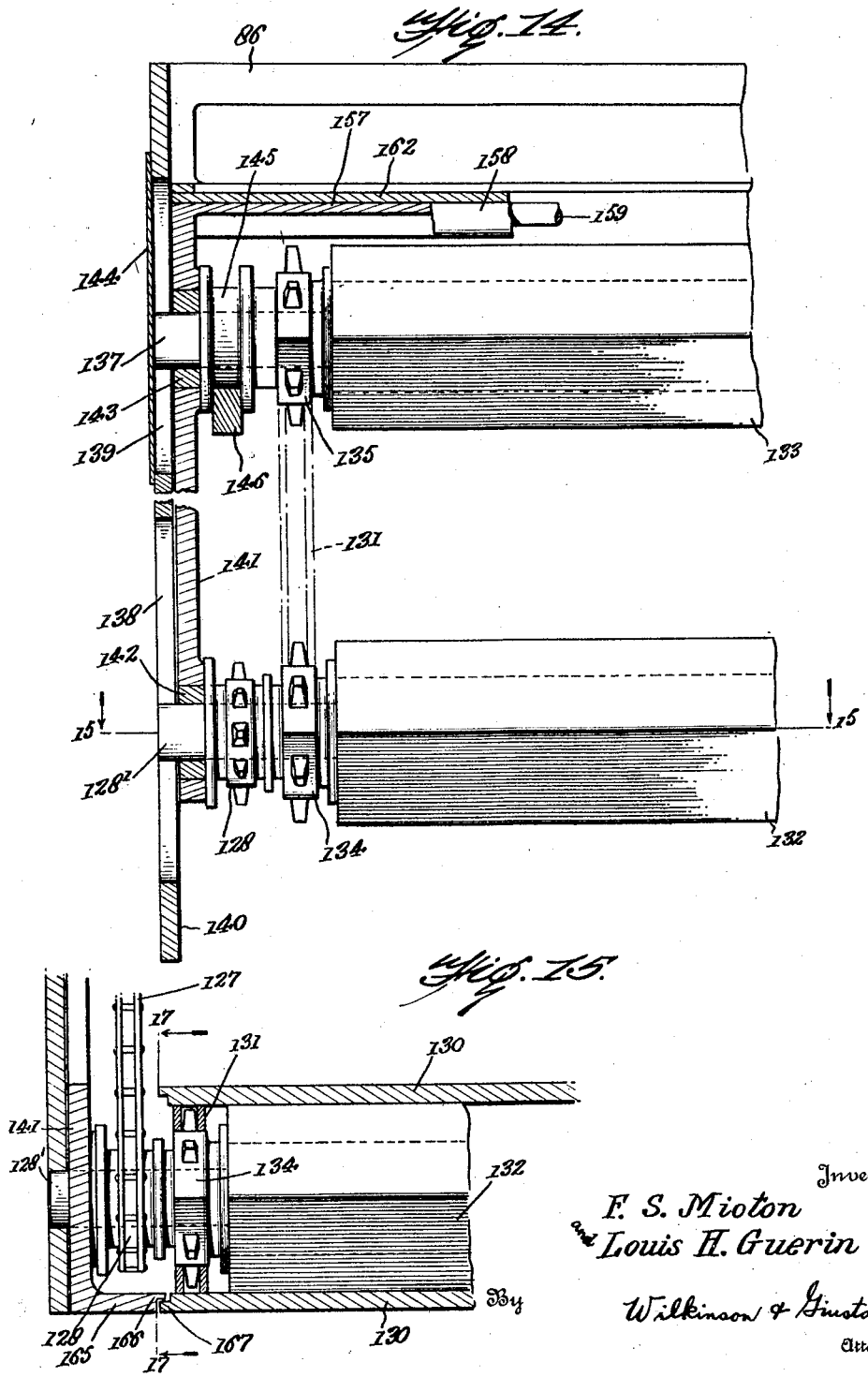

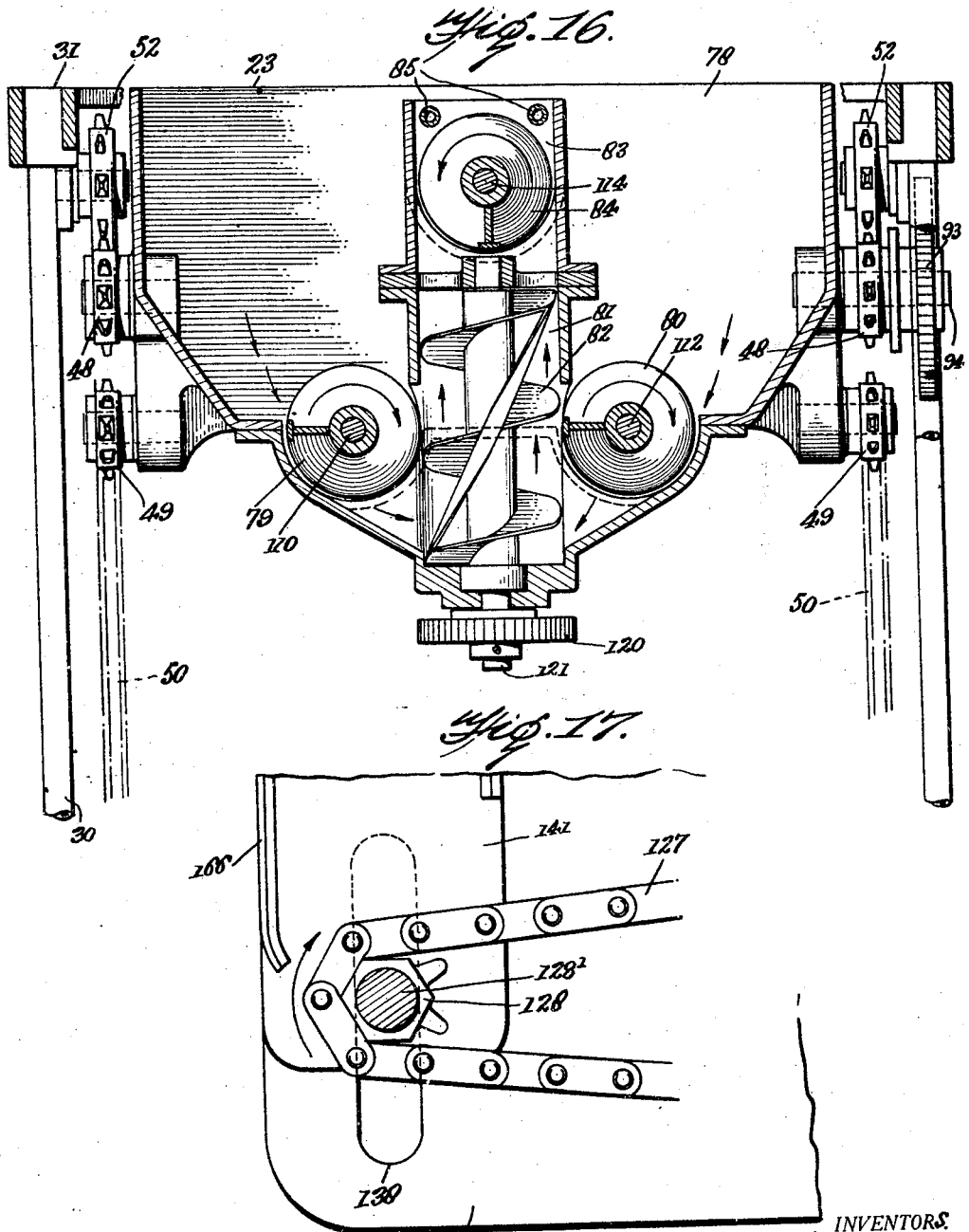

Sept. 11, 1928.
F. S. MIOTON ET AL
1,684,357
PLASTERING MACHINE
Filed May 19, 1927
9 Sheets-Sheet 9
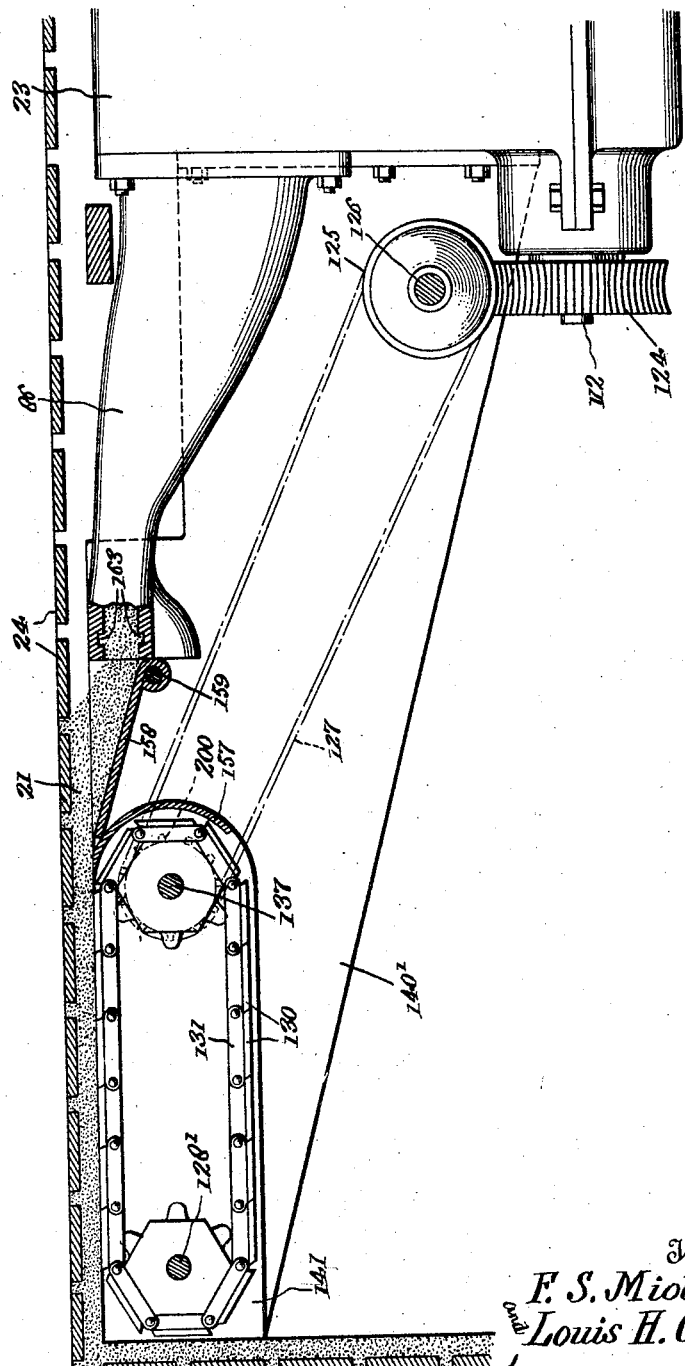

Patented Sept. 11, 1928.

1,684,357

UNITED STATES PATENT OFFICE.

FITZHUGH S. MIOTON, OF NEW ORLEANS, AND LOUIS H. GUERIN, OF COVINGTON, LOUISIANA.

PLASTERING MACHINE.

Application filed May 19, 1927. Serial No. 192,677.

The present invention relates to improvements in plastering machines, and has for an object to provide an automatic machine for mixing and preparing the plaster and applying it to the walls and ceiling.

Another object of the invention lies in providing a simply constructed, compact machine for applying plaster to walls and ceiling in which economy in operation is had by virtue of dispensing with hand labor and the rapidity with which the machine is adapted to perform its work over large areas of wall and ceiling.

A further object of the invention resides in providing an improved plastering machine adjustable as to height of ceiling, in which control of the plaster mixture is completely had, and in which the entire wall surface from floor to ceiling and including the corner portions and ceiling are accessible to the applicator for the rapid and thorough application of the plaster.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side view, with parts shown in section, of the lower portion of the frame showing the carriage in the lowermost position.

Figure 2 is a vertical sectional view taken through the carriage, showing the applicator in the uppermost position.

Figure 3 is a fragmentary side view, with parts in section, of the mixing conveyor.

Figure 4 is a rear end view with parts broken away of the carriage in the lowermost position showing parts of the frame broken away and parts in section.

Figure 5 is a longitudinal section taken through a form of clutch employed.

Figure 6 is a diagrammatic view of the entire apparatus with carriage indicated in intermediate position.

Figure 7 is a fragmentary horizontal section of one of the front corner posts and associated parts.

Figure 8 is a top plan view showing one of the top frame rails and associated sprocket.

Figure 9 is a vertical section taken on an enlarged scale through the applicator in the uppermost position against the wall and ceiling.

Figure 10 is a similar view showing the applicator in the intermediate position.

Figure 11 is a view similar to Figures 9 and 10 with the applicator shown in the lowermost position.

Figure 12 is a section taken on the line 12—12 in Figure 11.

Figure 13 is a side view of the trowel device shifting lever.

Figure 14 is an enlarged fragmentary section taken on the line 14—14 in Figure 1.

Figure 15 is a horizontal section taken on the line 15—15 in Figure 14.

Fig. 16 is a vertical section taken on the line 16—16 in Figure 2.

Figure 17 is a fragmentary section taken on the line 17—17 in Figure 15.

Figure 18 is a section through one of the frame posts.

Figure 19 is a cross section on line 19—19 of Figure 2, and

Figure 20 is a longitudinal section through a slightly modified form of apparatus suitable for ceiling work.

Referring more particularly to the drawings, in Figure 1 a wall is shown composed of the laths 20 and the plaster 21.

This plaster is applied through a trowel device indicated generally at 22 and carried up and down the wall by a vertically movable carriage 23, which is appropriately supported for this sliding movement in an adjustable framework.

The lowermost position of the carriage 23, is shown in Figures 1 and 4. An intermediate position of the carriage is indicated in Figures 6, 10 and 11 and in Figure 9 the trowel device is shown in the uppermost position. In this Figure 9 the ceiling laths are indicated at 24.

The adjustable frame which supports the carriage and the entire machine is shown to advantage in Figures 1 and 6 in which 25 designates the lower corner posts, which may be four in number. Figure 1 shows the two spaced hollow posts 25 from the side of the machine; while Figure 4 shows the two hollow posts from the rear end of the machine.

These posts are connected at their lower end by a lower rectangular frame 26 and at their upper end by a somewhat similar frame 27.

Telescoping within the hollow posts 25 are the intermediate posts 28, which carry at their upper ends a frame 29. At 30 are represented the uppermost posts or standards which telescope within the intermediate hollow posts 28 and carry at their upper ends the rectangular top frame 31 adapted to fit against the ceiling.

As shown in Figure 18 the posts are adapted to collapse downwardly, so that the frames 27, 29 and 31 approach very close to one another. The lower ends of hollow intermediate posts 28 are provided with the pistons 32 with perforations 33 to admit the pressure into the said hollow intermediate posts 28 and against the pistons 34 upon the lower ends of the smaller upper posts 30. The intermediate posts 28 may have external guide and stop rings 35 at their intermediate portions adapted to encounter the inwardly turned flanges or shoulders 36 at the upper ends of the hollow lower posts 25 for preventing the separation of the posts. In like manner guide stop rings 37 are provided on the intermediate portions of the upper posts 30 to guide the sliding movements of the posts 30 and also to abut against the inturned flanges or shoulders 38 at the upper ends of the intermediate posts 28.

The lower ends of the lowermost posts 25 are provided with the removable bases 39 and valved pipes 40 are made to communicate with the lower interior portions of the lowermost posts 25, whereby air or water under pressure may be admitted for the purpose of extending the posts and the frame upwardly until the upper frame 31 encounters the ceiling.

Referring again to Figure 1 the lowermost frame 26 is shown as provided with the rollers or castors 41, whereby the entire machine may be rolled into the room and may from time to time be rolled sidewise in order to bring the applicator to the proper position for applying the plaster.

The lowermost frame 26 is also provided with the screw jacks having the threaded shanks 42, the feet 43 provided with prongs, if desired, and having the operating handles 44 for rotating the shanks 42, whereby to either raise or lower the feet 43.

When the machine is in place, the frame may be elevated, so as to lift the rollers 41 from the floor to avoid the accidental or casual movement from its set position.

Now referring more particularly to Figure 6 the carriage 23 is shown to be guided in its vertical movement in the frame by the pairs of collapsible telescoping guide rods 45 and 46; the carriage having sleeves 58 loosely sliding on the guide rods. In this Figure 6 is also shown the chain arrangement by which the carriage is raised and lowered. The carriage 23 itself is provided upon each side with three sprocket wheels 47, 48 and 49. The wheels 47 and 48 are preferably in substantially the same horizontal line and are located above the sprocket wheel 49, which may be centrally located. The chain 50 which is an endless chain extends beneath the sprocket wheels 47 and 48 on the carriage and from these wheels it is carried upwardly and trained over sprocket wheels 51, 52 and 53 on the uppermost frame 31. Thence, the chain is carried downwardly from the sprockets 51 and 53 to the lower part of the frame and carried about sprockets 54 and 55 upon the lower frame 26, the chain being directed inwardly and about sprockets 56 and 57 also on the lower frame 26. The sprockets 56 and 57 are arranged close to one another and the opposite branches of the chain are brought up through the space between the sprockets 56 and 57 and looped about the central sprocket 49 on the carriage 23. The loops or bights of the chain are thus engaged about sprockets on the carriage 23. When the machine is in place, ready to apply plaster, chain 50 is tight over all sprockets and any adjustment of said chain 50 for any desired ceiling height is made through the addition or removal of the necessary number of links in the chain.

In Figure 7, some idea of the form which the frames may take is shown. This figure shows the hollow posts 25 in section and a fragment of the lowermost rectangular frame 26 in top plan view showing that this frame is composed of the spaced bars 59 and 60 with the solid head pieces 61, which are fitted about the lower portions of the hollow posts 25. An extension 62 of the inner bar 60 is provided to join with, receive and support the end of the front bar 63. It will be understood that the intermediate frames 27 and 29 will not have any such front bar 63, as such front bar would interfere with the vertical movement of the carriage 23 and the applicator 22, which projects forwardly through the frame. Still referring to Figure 7 the outer bar 59 is also provided with a short extension or lug 64 and in the spaced extensions 62 and 64 is journaled a shaft 65 fixed against rotation and carrying between the extensions 62 and 64 a slidable clutch collar 66, which is also keyed against rotation to the fixed shaft 65, although capable of the axially sliding movement thereon. The teeth of this clutch collar 66 are adapted to engage interlockingly with the teeth of a mating clutch collar 67 rotating freely about the fixed shaft 65, except when interlocked with the teeth of the sliding but non-rotatable clutch collar 66. The rotating collar 67 is fixed to rotate with the sprocket wheel 54, which turns freely about the fixed shaft 65, or that portion of the fixed shaft, which is expanded inwardly of the rectangular frame. The sliding clutch collar 66 may be moved longitudinally on the shaft 65 into and out of engagement with the rotary companion clutch collar 67 either by hand or by any known clutch shifting apparatus.

The purpose of locking the sprockets 54 against rotation is to cause lifting or lowering of the carriage 23. The locking of the sprockets 54 against rotation will prevent the traveling of the chain 50 about the sprockets and consequently, when the power is applied in an effort to cause this chain to travel, this effort will be transferred to shift the carriage 23, because of the arrangement in which the opposite end bights of the chain engage the sprockets on said carriage.

Now referring to Figure 8, the sprocket 53 at the upper right hand portion of the frame, as seen in Figure 6, is illustrated as being fixed on the stub shaft 68 carried in the downwardly and outwardly offset extension pieces 69 and 70 of the top frame 31, which frame is composed of the inner and outer spaced bars 71 and 72 and the solid head pieces 73, which are carried upon the upper ends of the uppermost telescopic posts 30.

As shown in Figure 6, sockets 74 may be carried by the frame 31 to fit over the upper ends of the top posts 30 and be secured thereto as by the set screws 75 entering the sides of the socket pieces 74 and engaging against the sides of the posts 30. The cross pieces of the upper frame are indicated at 76 in Figures 6 and 8 and these frame pieces are secured to the solid heads 73 in any appropriate manner. It will be clear from Figure 6 that the sprockets 51 on the front side of the machine are similarly supported.

The shaft in the lower right hand corner, as shown in Figure 6, is represented at 77, which shaft carries a sprocket 55 and, as also shown in Figure 4, is preferably the power shaft and may be driven in any appropriate manner as for instance by pulley wheel upon this shaft attached to a belt from an appropriate motor. The chains could be operated by hand, if desired.

In Figures 2 and 16, which show internal views of the carriage, 78 designates a hopper having a wide upper mouth into which the dry components of the plaster are deposited. The lower portion of the hopper converges downwardly on both sides and in the convergent portion, to opposite sides of the longitudinal center of the hopper, are arranged two horizontal screw conveyors 79 and 80, which are driven by appropriate gearing to rotate in such wise as to commingle and move the materials placed in the hopper toward the right, as shown in Figure 2, or to that end of the carriage in which is located the vertical transfer chamber 81 having therein the vertical spiral conveyor 82 acting to lift the commingled dry material upwardly to the wet or spray chamber 83 having therein the spiral or worm conveyor 84 operating in a direction opposite to that of the conveyors 79 and 80. The function of the conveyor 84 is to receive the commingled material lifted by the transfer conveyor 82, and move this material along in the spray chamber 83, while such commingled dry materials are subjected to the action of water sprayed in minute jets from the perforated pipes 85 disposed in the upper portions of the wet chamber 83. The further function of the conveyor 84 is to drive the material in the direction of the arrow, as shown in Figure 2, into the throat 86 which leads to the applicator.

Referring to Figure 4 the spray pipes 85 are supplied with water through a delivery pipe 87 connected to a pump 88, which is in turn connected by the receiving pipe 89 with a water tank 90 being a part of said carriage. The pump 88 is mounted upon a shaft 91, mounted in appropriate bearings transversely of the rear end of the carriage, and this shaft acts not only to drive the pump, but also to drive the various conveyors. This shaft 91 is shown in Figure 1 as having a pinion 92 thereon meshing with a gear wheel 93 fixed upon the shaft 94 to which the sprocket 48 is also fixed, whereby movement of the chain 50 will drive the gear wheels 93 and 92 and the shaft 91.

Gears 92 and 93, being at the outer ends of their respective shafts, can easily and quickly, be replaced by gears of varying ratios, so as to increase or decrease the speed of shaft 91, while maintaining a constant speed of chain 50 (raising or lowering 23).

The possibility of increasing or decreasing speed of 91 gives a perfect control of the quantity of mortar to be sent to applicator, and therefore regulates, for a contant travel of 23, the thickness of coating to be applied full width of applicator and trowel, or, quantity of mortar necessary to make a narrower strip with the use of sliding plates in slots 163 at mouth of applicator.

This is very important, as the speed of chain 50 is constant.

As shown in Figures 4 and 5 the gear wheel 92 is only loosely mounted on the shaft 91 and is held thereto as by the set collar 95. Clutch teeth 96 are provided on one face of the pinion 92 for interlocking engagement with similar teeth 97 on the sliding collar 98 which is keyed to the shaft 91, as indicated at 99. A bifurcated clutch operating lever 100 is engaged in the annular channel of the flanged collar 98, and is adapted to rock this collar into and out of engagement with the teeth on the pinion 92. The lever 100 is fulcrumed, as indicated at 101 in Figure 5. The fulcrum is mounted in an appropriate part of the framework.

Arms 102 and 103 may extend in opposite directions from the fulcrum or pivot 101. From the arms depend chains 104 and 105 whereby the lever may be shifted in the one or the other direction accordingly as it is desired to drive the shaft, the pump 88 and various conveyors or to disconnect these elements.

As seen in Figures 2 and 4, the shaft 91 is provided with the three worm wheels 106, 107 and 108. The worm wheel 106 is disposed in mesh with another worm wheel 109 on the shaft 110 of the conveyor 79. In like manner the worm wheel 107 meshes with a complemental worm wheel 111 on the shaft 112 of the opposite dry mixing conveyor 80. The intermediate worm wheel 108 meshes, as shown in Figures 2 and 4, with a companion worm wheel 113 on the shaft 114 of the wet conveyor 84. As shown in Figures 2 and 4 this worm wheel 108 also meshes with another worm wheel 115 on a vertical shaft 116 mounted in a bearing 117. The lower end of the shaft is provided with a pinion 118 meshing with a similar idler pinion 119 suitably supported by the framework or bearing, and meshing in turn with a pinion 120 mounted on the shaft 121 of the transfer vertical conveyor 82.

If desired, the large gear wheel 93, which is continuously driven, may be provided with a pawl and ratchet arrangement, or with some other one-way mechanical drive, whereby the gear wheel 93 will be turned when the carriage 23 is being elevated, but will run free when the carriage is being lowered, as in no case will it be desired to drive the conveyors in the reverse direction to that shown by the arrows and already described. However, such pawl and ratchet arrangement or one-way drive will not be absolutely necessary in view of the clutch arrangement shown in Figure 5, as action of the pump and conveyors may be suspended through the disengagement of this clutch.

As shown more particularly in Figure 3, the conveyors referred to are preferably provided with a mixing blade 122, being a flat thin strip spirally wound about the conveyor blades and seated preferably in notches 123 in the spiral continuous blade 84. The mixing strip 122 will be of greater pitch than the spiral blade 84 and extending between the blade will whip and agitate the material and cause thorough commingling thereof.

In Figures 1 and 2 there is shown a worm 124 mounted on the forward end of one or both of the shafts of the dry mixing conveyors 79 and 80. This worm wheel 124 meshes with a worm wheel 125 on the shaft 126 carrying a sprocket engaged by the chain 127. This chain 127 is shown in Figure 17, as engaging at its other end with a sprocket 128 on the lower shaft 128' of the trowel device. This chain 127 is also shown in Figure 15 and the sprocket 128 is shown also in Figure 14.

In Figures 1 and 2 the trowel device is shown as comprised of flat slats 130 mounted upon the links of an endless chain 131. These slats are adapted to smooth and push the plaster 21 into place against the laths 20 and the outer run of the endless trowel device moves upwardly in the direction of the arrow in Figures 1 and 2. The sides of the slats 130 are preferably beveled as shown in Figures 9, 10 and 11 because of this movement whereby to prevent plaster from entering between the slats.

The endless chain or chains 131 are carried upon the sprockets 134 and 135 shown more particularly in Figure 14. These sprockets 134 and 135 are arranged to drive hexagonal rollers 132 and 133. The trunnions or outer ends of the lower and upper shafts 128' and 137 of the trowel device are slidable in slots 138 and 139 in the side plates 140 of the fixed applicator framework. These side plates 140 are coupled to the carriage. Within the plates 140 slide the frame plates 141 which are provided with the bearings 142 and 143 for the shafts 128' and 137. The exteriors of the upper slots 139 may be concealed by the cover plates 144, shown in Figure 14. In Figure 14 there is also shown a flanged collar 145 engaging a lever 146. Two such flanged collars and levers could be provided at each end of the shaft 137, if desired. The lever itself is shown in Figure 13, as having a notched end 147 adapted to engage beneath the collar 145 and between the flanges of the same. The lever is also provided with a central boss 148 having an opening 149 for the shaft 150 about which it rocks. A perforation 151 in the opposite end of the lever is adpted to receive a pin 152 by which this end of the lever is pivotally coupled to a push bar 153 provided with a head 154 upon its upper end for engagement with the ceiling, as indicated in Figure 9. The push bar 153 slides through a guide sleeve 155, shown in top plan in Figure 12. This sleeve contains a bow spring 156 for frictionally bearing against the push bar 153 for the purpose of holding this bar in position until actively moved by engagement with the ceiling as hereinafter described.

As shown in Figures 9, 10 and 11, the trowel frame, which is movable and composed of the side pieces 141, shafts, etc., carries a segmental or arched crown wall 157 for protecting the upper sprockets and other parts from the plaster, and also for coupling the two plates 141 together. This crown wall 157 also receives and slidably supports the free end of a plaster deflecting plate 158 pivoted upon the rod 159, the ends of which slide freely in the vertically elongated slots 160 in the side plates 140 of the fixed applicator frame. A cut-off valve plate 161 is adapted to move up and down in front of the delivery mouth of the throat 86, as shown in Figures 9, 10 and 11. The cut-off plate 161 is provided with a top outwardly turned flange 162 resting above the deflecting plate 158 and its pivot rod 159.

As shown in Figure 15 the side plates 141 of the trowel frame are provided at the forward portions with angularly turned flanges 165 having notched and shallow ends 166 to agree with the notched and shouldered ends 167 of the slots 130, whereby a tight fit is formed at this point to prevent the entrance of plaster to the moving parts within.

In operation, the machine with all of the frames 27, 29 and 31, collapsed, as indicated in Figure 18, is moved on the rollers 41 into the room; thereafter hydraulic or air pressure is let into the room portions of the lower posts 25 to cause the upward extension of the frames until the top frame 31 strikes against the ceiling. Of course, the guide rods 45 and 46 for the carriage, which are mounted in the frame are also expanded with the frame. The jacks 42 may thereupon be operated upon to lift the apparatus from the rollers 41 to avoid the slipping of the device. The chain 50 is properly adjusted around all the frame and carriage sprockets.

The carriage is initially in the lowermost position, shown in Figure 1. The ingredients or components for the plaster are poured into the hopper 78 and the mixing conveyors are started in motion by and through the chain 50, it being understood that the clutch device 66, 67 shown in Figure 7, is initially disengaged, so that the driving of the chain will not originally lift the carriage 23, but the chain will simply travel through the various sprockets and actuate the gearing for the mixing conveyors. The lateral conveyors 79 and 80 in the hopper 78 will agitate, mix and thoroughly commingle the components of the plaster in the dry state and these commingled components will subsequently be transmitted to the lifting conveyor 82, and transferred to the wet chamber 83, which is centrally of the hopper, as shown in Figure 16. Here such commingled ingredients come under the influence of the horizontally traveling conveyor 84 by which they are moved along, while subjected to the water spray from the perforated pipes 85. The plaster is thus put in immediate condition for application to the walls. Such plaster passes out through the throat 86, which is of any suitable shape and provided at its delivery mouth, as indicated in Figure 11, with notches 163 for the positioning of plates of various dimensions to restrict or enlarge the delivery mouth and in this way regulate the amount of plaster passing about and against the wall and between the wall and the traveling trowel device, and also permit control of the widths of strips of plaster it is desired, or necessary to apply. The trowel will be travelling in the direction of the arrows, shown in Figures 1 and 2, whenever the conveyors are moving, irrespective of the movement of the carriage 23. Normally the trowel device will be in the lowermost position, shown in Figures 1 and 11. In this condition the deflecting plate 158 is in a diagonal position resting upon the segmental arch wall 157 and the plaster, which exudes through the mouth of the throat is directed downwardly in a stream along the plate 158, crown wall 157 and to the wall laths and against the moving trowel device, which compacts the plaster against the laths and smooths the surface thereof.

Whenever, the carriage is to be raised, the operator simply engages the clutch device, shown in Figure 7, thus anchoring the chain at this point and causing the further movement of the chain to communicate a lifting movement to the carriage 23, as indicated in Figure 6. The power is applied at the shaft 91 on the carriage. This shaft drives the sprocket 48 on the carriage, and the sprocket 48 drives the chain, all of the other sprockets being idlers. Now, when the chain is secured against movement at the idler sprocket 54, the chain will be prevented from running around the drive sprocket 48. Consequently the drive sprocket 48, on the carriage, will climb up or down the chain. As the carriage is raised the delivery of plaster continues and the operation of the trowel device is in no wise suspended.

When the carriage nears the ceiling, the plunger device 154 will first encounter the ceiling 24, and through the lever arrangement 146 will gradually shift the trowel frame upwardly in the slots of the side plates 140. The intermediate position is shown in Figure 10, in which the crown wall 157 has lifted the plate 158 to a horizontal position. The final position is shown in Figure 9, in which the crown wall 157 has acted through the deflecting plate 158 and flange 162 to shift the cut-off plate 161 to the uppermost position or entirely across the delivery mouth of the throat 86. The supply of plaster is thus cut off. If desired, an automatic mechanism may also be employed for supplying the further downward movement of the carriage and for suspending the operation of the conveyors, or this might be done by hand as desired.

Referring to Figure 20, here the machine is shown arranged for ceiling work. In this figure, the plates 140 are replaced by plates 140' secured in the same way to the carriage 23. The substitute plates 140' are provided only with holes for the shafts 128' and 130

137 and for the pin 159, but this substitute plate is without any slots and is adapted to support the trowel device in a horizontally elongated position well up toward the ceiling. The trowel device is driven by the same chain 127 extending up to and about a sprocket 200 on the shaft 137. Apron 158 assumes the position shown to guide the plaster from the throat 86 to the ceiling laths.

It will be appreciated from the foregoing that the machine will plaster from the floor to the ceiling completely including all of the corners. The machine is compact and may be utilized in hall-ways, as well as in rooms, and such machine will have a wide range in the height of ceilings owing to the extensibility of the frame. The arrangement is such that the machine mixes its own plaster, while using the same so that it is unnecessary that any mortar should be left in the hopper to be wasted, or to set and so be difficult of removal and damage the machinery. The control as to the amount of moisture may be regulated to a nicety and the quantity of mortar discharged to the wall may also be completely regulated; also the strip of plaster may be as wide or as narrow as desired. The thickness of the coating of the plaster is regulated by the distance of the trowel device from the laths of the wall, and by the use of gears of proper ratio at 92 and 93, as hereinbefore described.

Of course, the slats of the trowel device will move upward faster than the movement of the carriage, and the arrangement is such that no material will be wasted or allowed to fall upon, litter and discolor the floors.

It is obvious that various changes and modifications may be made in the details of construction and design of the above specifically described embodiment of this invention without departing from the spirit thereof, such changes and modifications being restricted only by the scope of the following claims:—

What is claimed is:—

1. A plastering machine comprising a frame, a carriage movably mounted thereon and having a dry mixing chamber, a wet mixing chamber and an intermediate transfer chamber, conveyors and agitators in said chambers, means for driving said conveyors and agitators, means for varying the speed of said conveyors and agitators from a constant source of power, means for controlling movement of said conveyors and agitators in relation to movement of the carriage, a delivery throat leading from said wet mixing chamber, and a trowel positioned to receive the prepared plaster from said throat and apply it to the surface to be coated.

2. A plastering machine comprising a frame, a carriage movably mounted thereon, a dry mixing hopper in the carriage, a wet mixing chamber in the carriage, a transfer chamber between said hopper and wet mixing chamber, controllable conveyors in said hopper and in said chambers, a water reservoir carried with the carriage, spray means in said wet mixing chamber, a pump for circulating water from said reservoir to the spray means, means for driving said conveyors, a delivery throat leading from the wet mixing chamber, and a trowel positioned to receive the wet plaster from said delivery throat and apply it to the surface to be treated.

3. A plastering machine comprising a frame, a carriage movably mounted thereon, and an applicator moving with said carriage and composed of an endless conveyor, flat slats carried by said conveyor for smoothing the plaster in place, and means for driving said conveyor.

4. A plastering machine comprising a frame, a movable carriage thereon, and an applicator moving with said carriage and for receiving plaster from the carriage, said applicator comprising endless conveyor means, means for driving said endless conveyor means, slats carried by the conveyor means for smoothing the plaster in place, and means for furnishing plaster from the carriage to the wall above the applicator.

5. A plastering machine comprising a frame, a carriage movably mounted thereon, and an applicator carried by said carriage and comprising a shiftable trowel device for compacting and smoothing the plaster in place, means for automatically shifting the trowel upwardly when the carriage approaches the ceiling, and a cut-off valve plate for the plaster associated with the movable trowel and adapted to be closed on the upward movement of the trowel.

6. A plastering machine comprising a frame, a movable carriage thereon, and an applicator supported by said carriage and including a vertically shiftable trowel, a lever connected to the trowel, a push rod connected to the lever and arranged to strike the ceiling as the carriage approaches such ceiling whereby to shift the trowel upwardly, a cut-off valve plate for the plaster positioned to be shifted to the closed position by the trowel on its upward movement, and a pivoted plaster guide plate above the trowel.

7. A plastering machine comprising an extensible and adjustable frame, a carriage movably mounted up and down on the frame, means for moving said carriage, plaster mixing means in said carriage, and an applicator supported by said carriage and arranged to receive plaster from the carriage, said applicator including a shiftable trowel, means associated with the trowel for shifting the same upwardly when the carriage approaches the ceiling, and a cut-off valve plate positioned to be closed by the carriage on the upward movement thereof for cutting off the supply of plaster to the trowel.

8. A plastering machine comprising a wheeled adjustable frame, jacks carried by said frame for securing the same against movement, a movable carriage on said frame, means for moving said carriage, plaster preparing means in said carriage, a trowel moving with said carriage and having an independent movement of its own relatively to the carriage, means for shifting said trowel when the carriage approaches the ceiling, means for driving the trowel, and a cut-off means between the trowel and plaster preparing means shiftable by the upward raising movement of the trowel.

9. A plastering machine comprising a frame, a carriage movably mounted in the frame for holding plaster and having a delivery throat, means to move the carriage, an endless trowel supported on the carriage movable relatively to the carriage and positioned to receive the plaster from said throat, and a convex plate above the endless trowel for receiving the plaster from the throat and guiding same onto the wall.

10. A plastering machine comprising a frame, a carriage movably mounted on said frame, sprockets carried by said frame, other sprockets mounted on said carriage, an endless chain engaged about the sprockets both on the frame and carriage, driving means associated with a sprocket on the carriage, whereby to drive the chain and the other sprocket, means on the frame for securing the chain against movement, whereby the driving means will act to shift the carriage along the fixed chain, and an applicator supported by said carriage.

11. A plastering machine comprising a frame, a carriage mounted for vertical movement in said frame, a pair of sprockets mounted on the upper portion of the carriage, a third sprocket mounted upon the lower portion of the carriage, an endless chain having one bight thereof extending about the pair of sprockets, and the other bight thereof extending about the third sprocket, other sprockets upon the upper and lower portions of the frame engaged by said chain, means associated with one of the sprockets on the carriage for driving said chain, means associated with one of the sprockets on the frame for securing the chain against movement, whereby the carriage will climb up the fixed chain, and an applicator carried by the carriage.

FITZHUGH S. MIOTON.
LOUIS H. GUERIN.